United States Patent
Bhinde

(10) Patent No.: US 7,037,480 B2
(45) Date of Patent: May 2, 2006

(54) CALCIUM CHLORIDE PURIFICATION

(75) Inventor: Manoj V. Bhinde, Boothwyn, PA (US)

(73) Assignee: Sunoco Inc. (R&M), Philadelphia, PA (US)

( * ) Notice: Subject to any disclaimer, the term of this patent is extended or adjusted under 35 U.S.C. 154(b) by 197 days.

(21) Appl. No.: 10/820,395

(22) Filed: Apr. 8, 2004

(65) Prior Publication Data

US 2005/0226980 A1    Oct. 13, 2005

(51) Int. Cl.
  *C01F 11/24*    (2006.01)
  *C01F 11/32*    (2006.01)

(52) U.S. Cl. .................. 423/497; 210/683; 210/915

(58) Field of Classification Search ............... 423/497, 423/491; 210/683, 915; 426/74
See application file for complete search history.

(56) References Cited

U.S. PATENT DOCUMENTS

| | | | |
|---|---|---|---|
| 2,072,376 A | 3/1937 | McKee et al. ............... 210/673 |
| 2,157,509 A | 5/1939 | Urbain et al. ............... 210/683 |
| 2,553,595 A * | 5/1951 | Maier ......................... 423/158 |
| 3,976,447 A | 8/1976 | Merchant et al. ........... 423/483 |
| 4,323,462 A * | 4/1982 | Bruckenstein ............... 210/714 |
| 5,205,928 A * | 4/1993 | Inoue et al. ............. 210/198.2 |
| 5,403,495 A | 4/1995 | Kust et al. ................... 210/710 |
| 6,355,221 B1 | 3/2002 | Rappas ....................... 423/483 |
| 2003/0232232 A1 * | 12/2003 | Hatano ......................... 429/34 |

FOREIGN PATENT DOCUMENTS

EP      0 191 893 B1    11/1991
WO    WO 98/10851    3/1998

* cited by examiner

*Primary Examiner*—Ngoc-Yen Nguyen
(74) *Attorney, Agent, or Firm*—Robert A. Koons, Jr.; Matthew P. McWilliams; Drinker Biddle & Reath LLP

(57) ABSTRACT

Significant amounts of soluble fluoride, known to create problems in processes requiring high quality grade calcium chloride, are removed from calcium chloride solution using hydroxyapatite as a removal mechanism. Under acidic conditions, calcium chloride solution is purified to about less than 10 ppm fluoride, significantly, to less than 1 ppm fluoride. At least 0.1 weight percent hydroxyapatite and concentrated hydrochloric acid are added to calcium chloride solution and slurried to remove fluoride and create a highly purified calcium chloride solution, substantially free of fluoride.

11 Claims, 3 Drawing Sheets

CALCIUM CHLORIDE PURIFICATION

FIELD OF THE INVENTION

This invention relates in general to a process for removing fluoride by ion exchange. Specifically, this invention relates to a process for manufacturing low fluoride calcium chloride, or removing soluble fluoride from calcium chloride using a naturally occurring mineral to purify the calcium chloride. More specifically, this invention relates to a process for purifying calcium chloride by removing soluble fluoride using hydroxyapatite.

BACKGROUND OF THE INVENTION

Calcium chloride is used in different applications, some of which require "food-grade" calcium chloride that contains low concentrations of fluorides and other contaminants. For example, calcium chloride is used in bisphenol-A plants to break the hydrochloric acid/water azeotrope in hydrochloric acid recovery columns. In this particular application, fluoride ions will concentrate and convert to hydrogen fluoride in the HCl recovery column. Hydrogen fluoride, known to dissolve glass, creates pin holes in the recovery column, disrupting the recovery process and creating leakage problems. "Food grade" calcium chloride is also used in actual food applications, which naturally require high quality materials.

The fluoride concentration in "food-grade" calcium chloride is typically less than 10 ppm. However, this grade of calcium chloride is often difficult to obtain and is therefore expensive. It would thus be desirable to remove the fluoride ions from the calcium chloride solution prior to its use in applications requiring low-fluoride, or "food grade" quality calcium chloride. Many present methods for removing fluoride ions from process and wastewater streams are inadequate or cost prohibitive for obtaining the desired fluoride-free calcium chloride solution because they are inapplicable when calcium and chloride concentrations are high. U.S. Pat. No. 6,355,221 to Rappas and U.S. Pat. No. 5,403,495 to Kust et al. teach the use of calcium fluoride as a seed for creating enhanced calcium fluoride particles in order to remove soluble fluoride from the wastewater streams.

The use of adsorbents to remove fluoride ions in solution has also been effective under certain conditions. For example, European Patent No. EP0191893 to Nomura et al. discloses contacting a solution containing fluorine compounds with various hydrated rare earth oxide adsorbents. Similarly, International Publication No. WO 98/10851 teaches the removal of fluoride ions in solution by passing the solution through an ion exchange resin to produce an ultrapure hydrofluoric acid. However, these methods do not solve the problem of removing fluoride ions from solutions containing high calcium and chloride ion concentrations, thereby generating a purified calcium chloride stream for use in later processing. These methods also do not produce a calcium chloride solution with as little as less than 1 ppm of fluoride.

It would also be advantageous to have an easy, cost-effective method of manufacturing low fluoride calcium chloride.

SUMMARY

Briefly, the invention relates to a method for removing fluoride from aqueous solution. More specifically, the invention relates to the removal of soluble fluoride from a calcium chloride solution to produce purified calcium chloride with extremely low concentrations of fluoride in the range of 0 to 10 ppm.

In one embodiment of the present invention, fluoride is removed from calcium chloride solution by causing ion exchange between the solution and an ion-containing material. According to one aspect of this invention, the ion-containing material is a natural material that is mixed with the calcium chloride in the form of a slurry. Ion exchange occurs whereby the fluoride ions in solution are substituted for the hydroxide ions in the material. The natural material is hydroxyapatite, or calcium phosphate/calcium hydroxide composite. The contact between the fluoride ions and the slurry causes ion exchange between the solution and slurry, causing adsorption of the fluoride ions. Chloride ions are too big to exchange for hydroxide ions in the hydroxyapatite matrix, therefore the chloride ions stay in solution.

The solubility of fluoridated hydroxyapatite is extremely small. The solubility product, Ksp of fluor-hydroxyapatite, is $Ca_{10}(PO_4)_6(F_2OH)_2$ is $3.16 \times 10^{-60}$ (*Saliva and Tooth Dissolution*, http://www.ncl.ac.uk/dental/oralbiol/oralenv/tutorials/calciumphosphate.htm, Jul. 16, 2003). As a result, the fluoride ions remain in the hydroxyapatite matrix and do not re-enter solution during the purification process.

The resulting purified calcium chloride solution is filtered out or removed from the slurry according to the designated application or end use for the product. The resulting product has a fluoride concentration of as low as less than 1 ppm, and has broad uses in applications requiring ultra low fluoride concentration calcium chloride.

According to another embodiment of the present invention, calcium chloride with ultra low fluoride concentrations is manufactured by mixing lime or calcium carbonate with aqueous hydrochloric acid and calciumtriphosphate or other hydroxyapatite in a slurry process. Kirk-Othmer Encyclopedia, Vol. 4, p. 790, describes a process to make calcium halides by reaction of calciumcarbonate, calcium oxide, or lime with hydrohalic acid. In a similar process, calcium carbonate or lime can be mixed with hydrochloric acid and hydroxyapatite to create calcium chloride that has an ultra-low fluoride concentration.

DETAILED DESCRIPTION OF THE INVENTION

The present invention provides a method of using hydroxyapatite to remove fluorides and purify calcium chloride solution. Hydroxyapatite is preferably slurried into calcium chloride solution and acid is added to lower the pH during the purification process. Calcium chloride solutions of 30 to 35 weight percent calcium chloride typically contain 10 to 100 ppm of fluoride. The method of the present invention cuts the fluoride concentration to less than 10 ppm in solution.

According to one embodiment of the present invention, an aqueous solution of calcium chloride, hydroxyapatite and hydrochloric acid are slurried in a reaction vessel. Preferably, 0.5 weight percent hydroxyapatite and concentrated hydrochloric acid (approximately 35 to 38 weight percent) are slurried into calcium chloride for at least 1 minute. The final acid concentration in solution is approximately 0.08 percent by volume. Preferably, the reaction is carried out for less than 48 hours at a temperature less than about 200° F., more preferably less than 24 hours and between 50 to 150° F. After the reaction is complete, the purified calcium chloride solution is filtered, or removed using some other method.

Figure 1:
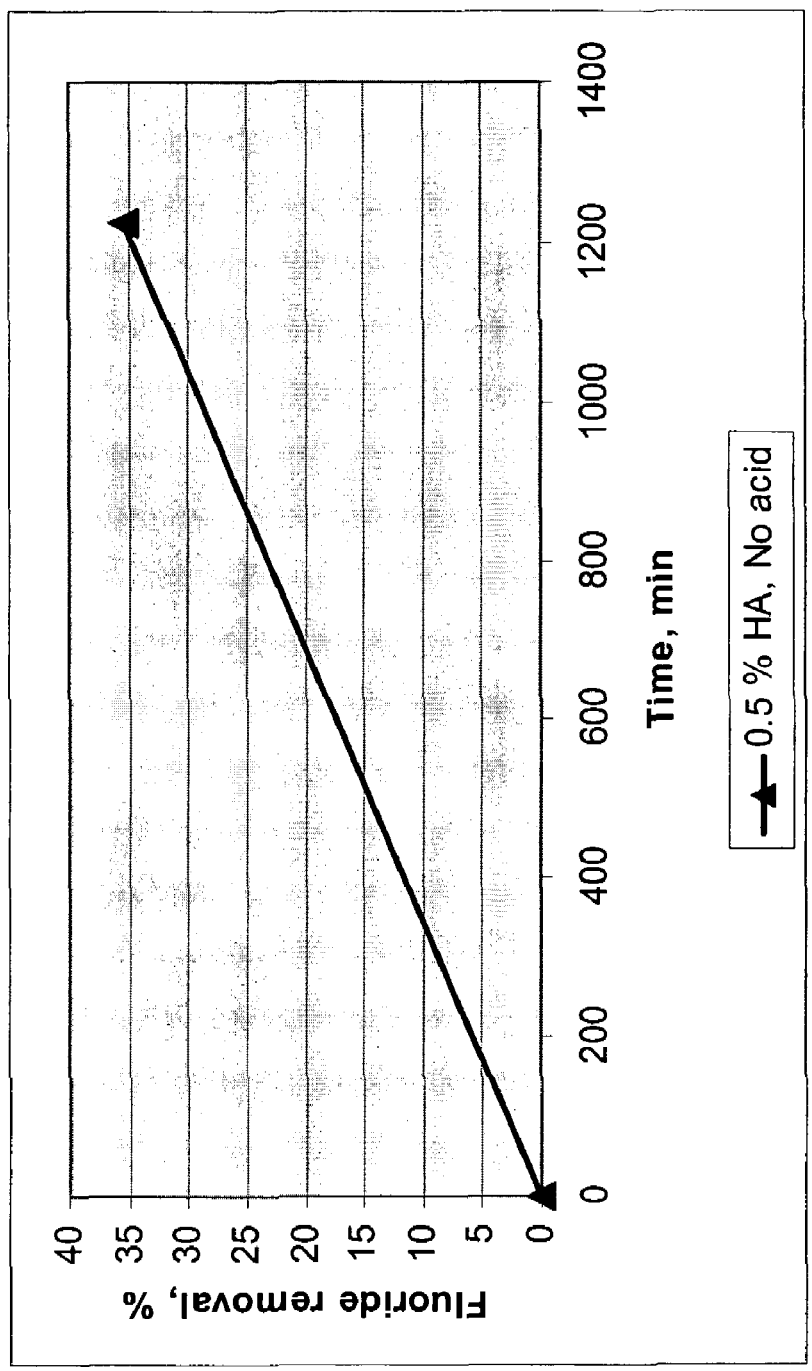
FIG. 1 is a graph of percentage of fluoride removal over time with 0.5 weight percent hydroxyapatite and no acid addition.

The pH of the reaction slurry has a significant impact on purification of the calcium chloride. As illustrated on FIG. 1, at 72° F., 0.5 weight percent hydroxyapatite, and no acid addition, only 35% of the fluoride ions present in calcium chloride solution were removed after approximately 24 hours. With the addition of concentrated hydrochloric acid to obtain a solution with a final acid concentration of 0.075 percent by volume hydrochloric acid (a pH of less than 1), and the addition of 0.5 weight percent hydroxyapatite, at approximately 140° F., fluoride removal increased to 95% in less than 20 minutes as illustrated on FIGS. 2 and 3. Referring to Table 1 below, at 140° F. and 0.5 weight percent hydroxyapatite, the addition of acid per 100 grams of 35 weight percent calcium chloride solution significantly increases fluoride removal after 4 hours of reaction time:

TABLE 1

| HCl (acid drops/100 g CaCl$_2$) | Fluoride Removal (%) |
| --- | --- |
| 0 | 41 |
| 1 | 65 |
| 2 | 88 |

Similarly, the hydroxyapatite concentration has a significant impact on the purification process, as illustrated in Table 2 below. The following fluoride removal percentages were realized at different concentrations of hydroxyapatite addition after 20 minutes of reaction time with fluoride contaminated calcium chloride:

TABLE 2

| In-solution weight percent of hydroxyapatite | Fluoride Removal (%) | Resulting Fluoride Conc. (ppm) |
| --- | --- | --- |
| 0.0 | 2 | 18.7 |
| 0.1 | 34 | 12.5 |
| 0.25 | 79 | 4.0 |
| 0.5 | 95 | 1.0 |

Figure 2:
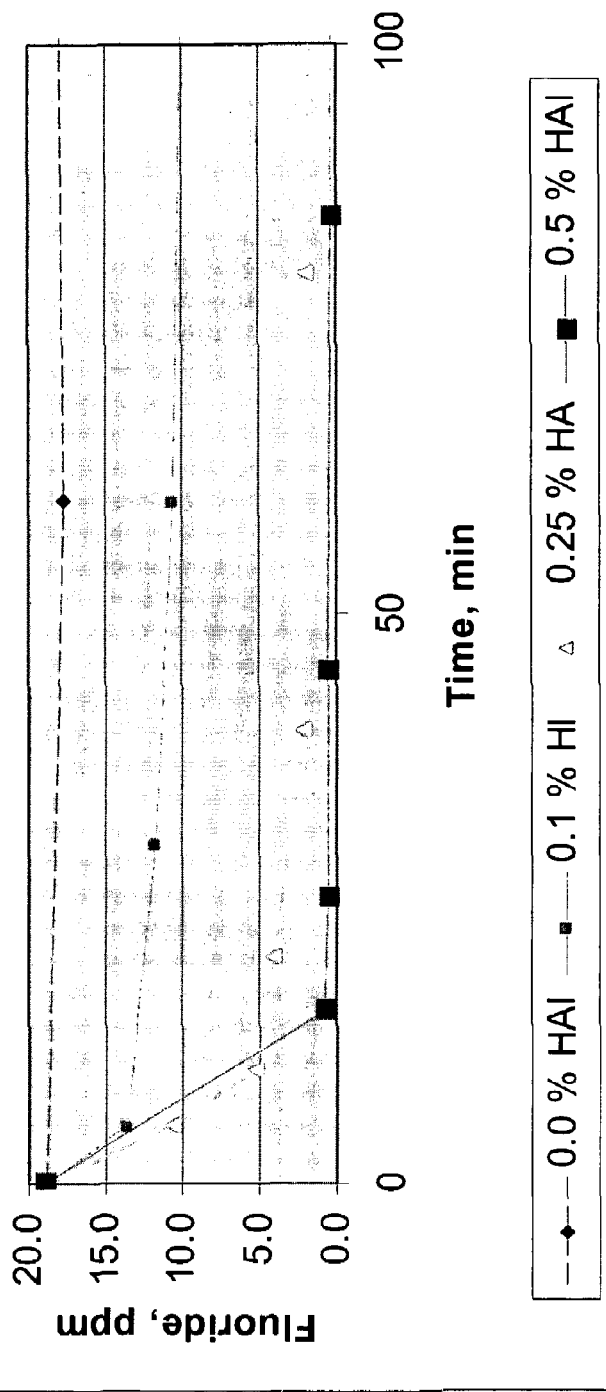
FIG. 2 is a graph of fluoride removal over time with a final acid concentration of 0.075 weight percent hydrochloric acid and varying amounts of hydroxyapatite.
Figure 3:
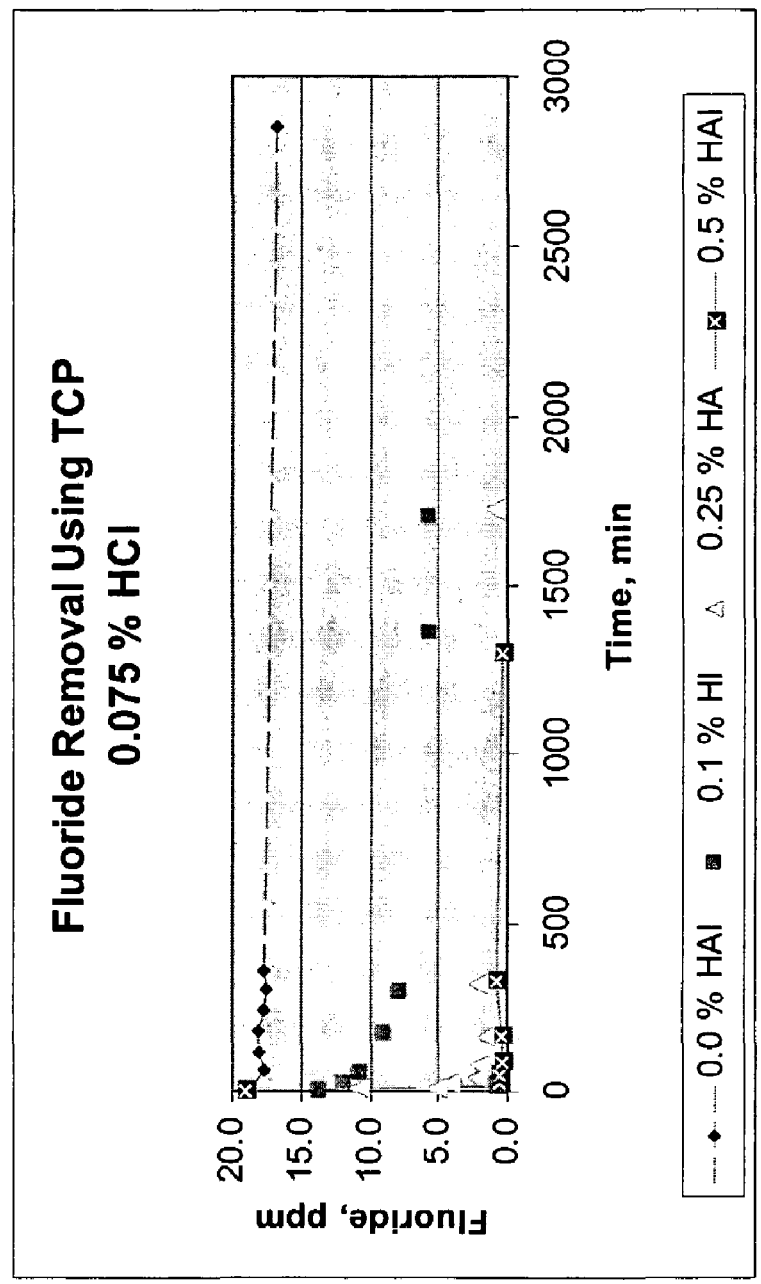
FIG. 3 is another graph of fluoride removal over an extended time period with a final acid concentration of 0.075 weight percent hydrochloric acid and varying amounts of hydroxyapatite.

The following Examples illustrate one embodiment of the present invention for fluoride removal from 200 grams of 35 weight percent aqueous calcium chloride solution. FIGS. 2 and 3 plot the results of fluoride removal according to the process carried out in these Examples.

EXAMPLE 1

200 grams of calcium chloride feedstock was slurried with 150 microliters of concentrated HCl to a final acid concentration of 0.075 weight percent in a batch reactor at 140° F. with no hydroxyapatite. After 6 hours, the fluoride concentration was reduced by only about 6 percent, from a concentration of 18.8 ppm to a concentration of 16.7 ppm.

EXAMPLE 2

200 grams of calcium chloride feedstock was slurried with 150 μL of concentrated HCl to a final acid concentration of 0.075 weight percent and 0.21 grams hydroxyapatite (0.1 weight percent in solution) in a batch reactor at 140° F. The starting fluoride concentration in the calcium chloride feedstock was approximately 18.8 ppm. After 5 minutes, approximately 28 percent reduction in fluoride was realized; the fluoride concentration was reduced to 13.6 ppm. After 24 hours, approximately 70 percent reduction in fluoride was realized, the final fluoride concentration at 5.7 ppm.

EXAMPLE 3

200 grams of calcium chloride feedstock was slurried with 150 μL of concentrated HCl (to a final acid concentration of 0.075 weight percent and a pH of −0.2) and 0.5 grams of hydroxyapatite (0.25 weight percent in solution) in a batch reactor at approximately 140° F. Fluoride removal occurred exponentially, as indicated on Table 2. After 5 minutes, the fluoride concentration was reduced from 18.8 ppm to 10.6 ppm, an approximate 44 percent reduction in fluoride concentration, and after approximately 24 hours, the fluoride concentration was measured at approximately 1.0, an approximate 95 percent reduction.

EXAMPLE 4

In another example, 1.01 g of tricalciumphosphate (0.5 weight percent in solution) and 150 μL of concentrated HCl were slurried in 200 grams of calcium chloride feedstock at 133° F. The solution pH was 0.08. The untreated feedstock contained approximately 19 ppm fluoride. After 15 minutes, the fluoride concentration was reduced to 0.8 ppm, and after 24 hours, approximately 98 percent was removed, a final measured fluoride concentration of approximately 0.4 ppm.

As illustrated herein, under acidic conditions, preferably a pH less than 2, and more preferably a pH less than 1, with the addition of hydroxyapatite to calcium chloride solution that contains unwanted contaminants, significant fluoride removal is obtained.

According to yet another embodiment of the present invention, an aqueous solution of hydroxyapatite, hydrochloric acid, and calcium carbonate or lime are slurried in a reaction vessel to produce low-fluoride calcium chloride solution. Methods of manufacturing calcium chloride, and other calcium compounds, are well known in the industry. For example, the Kirk-Othmer Encyclopedia, Vol. 4, p. 790, describes a method of making calcium halides by reacting calcium carbonate, calcium oxide, or lime with hydrochloric acid. The addition of hydroxyapatite to known processes for manufacturing calcium chloride greatly increases fluoride removal to produce ultra-low fluoride containing calcium chloride solutions.

The foregoing illustrations of embodiments of the present invention are offered for the purposes of illustration and not limitation. It will be readily apparent to those skilled in the art that the embodiments described herein may be modified or revised in various ways without departing from the spirit and scope of the invention. The scope of the invention is to be measured by the appended claims.

What is claimed is:

1. A method of removing fluoride from calcium chloride comprising mixing calcium chloride solution with hydroxyapatite in the presence of an acid.

2. The method of claim 1 wherein said hydroxyapatite is 0.1 to 5 weight percent tri-calciumphosphate.

3. The method of claim 1 wherein the acid is hydrochloric acid.

4. The method of claim 1 wherein the hydrochloric acid is added in an amount sufficient to obtain a pH of less than about 2.

5. A method for removing soluble fluoride from a calcium chloride solution comprising:

mixing said calcium chloride solution with hydroxyapatite and an acid to form a slurry at a pH less than about 2 for at least 1 minute, and filtering out a purified calcium chloride solution.

6. The method of claim 5 wherein the concentration of said hydroxyapatite is in the range of from about 0.1 to 5 weight percent.

7. The method of claim 5 wherein the concentration of soluble fluoride in the purified calcium chloride solution is in the range of 0 to 10 ppm.

8. The method of claim 5 wherein the acid is hydrochloric acid.

9. A method for producing ultra-low fluoride food-grade calcium chloride comprising mixing a calcium chloride solution with hydroxyapatite and an acid to form a slurry at a pH of less than 2 for at least 1 minute, and filtering out purified calcium chloride solution.

10. A method of producing calcium chloride with an ultra-low fluoride concentration comprising mixing hydroxyapatite, hydrochloric acid, and a calcium source.

11. The method of claim 10 wherein said calcium source is calcium carbonate or lime.

* * * * *